United States Patent
Nguyen et al.

(10) Patent No.: US 9,924,236 B2
(45) Date of Patent: Mar. 20, 2018

(54) INFORMATIONAL BANNER CUSTOMIZATION AND OVERLAY WITH OTHER CHANNELS

(71) Applicant: EchoStar Technologies L.L.C., Englewood, CO (US)

(72) Inventors: Phuc H. Nguyen, Parker, CO (US); Christopher William Bruhn, Aurora, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/933,818

(22) Filed: Nov. 5, 2015

(65) Prior Publication Data

US 2017/0134822 A1    May 11, 2017

(51) Int. Cl.

| | |
|---|---|
| *H04N 21/488* | (2011.01) |
| *H04N 21/431* | (2011.01) |
| *H04N 21/81* | (2011.01) |
| *H04N 21/485* | (2011.01) |
| *H04N 21/44* | (2011.01) |
| *H04N 21/433* | (2011.01) |
| *H04N 21/426* | (2011.01) |

(52) U.S. Cl.
CPC ..... *H04N 21/4886* (2013.01); *H04N 21/4263* (2013.01); *H04N 21/4314* (2013.01); *H04N 21/4316* (2013.01); *H04N 21/4334* (2013.01); *H04N 21/44008* (2013.01); *H04N 21/44016* (2013.01); *H04N 21/4858* (2013.01); *H04N 21/8133* (2013.01)

(58) Field of Classification Search
CPC .......... H04N 21/4886; H04N 21/4316; H04N 21/4314; H04N 21/4858; H04N 21/44016; H04N 21/4263
See application file for complete search history.

(56) References Cited

U.S. PATENT DOCUMENTS

| 6,833,874 | B2 | 12/2004 | Ozaki et al. | |
|---|---|---|---|---|
| 8,629,939 | B1 * | 1/2014 | Freund | H04N 5/145 348/468 |
| 8,826,318 | B2 * | 9/2014 | Srinivasan | G06Q 30/02 725/145 |
| 2007/0086728 | A1 * | 4/2007 | Dolph | G11B 27/034 386/262 |
| 2007/0143786 | A1 * | 6/2007 | Deitsch | G06Q 30/02 725/32 |
| 2007/0261074 | A1 * | 11/2007 | Yun | H04H 60/37 725/20 |
| 2008/0052742 | A1 * | 2/2008 | Kopf | H04N 5/44591 725/34 |

(Continued)

*Primary Examiner* — Pinkal R Chokshi
(74) *Attorney, Agent, or Firm* — Seed IP Law Group LLP (57) ABSTRACT

Embodiments are directed towards extracting an informational banner from a first source and combining it with video content from a second source. The informational banner may be a news ticker, a scoreboard, an informational window of a program, etc. The informational banner is selected or identified from the first source using one or more different automated or user-selectable methods. The extracted informational banner is combined with video content from the second source at a display location that is automatically determined or selected by a user. The combined content is then provided to a display device for presentation to the user.

16 Claims, 10 Drawing Sheets

(56) References Cited

U.S. PATENT DOCUMENTS

| | | | |
|---|---|---|---|
| 2008/0084503 A1* | 4/2008 | Kondo | G09G 5/005 348/556 |
| 2009/0164601 A1* | 6/2009 | Swartz | G06Q 30/02 709/217 |
| 2009/0222754 A1* | 9/2009 | Phillips | H04N 21/235 715/774 |
| 2010/0247061 A1* | 9/2010 | Bennett | G06F 17/30056 386/247 |
| 2012/0183276 A1* | 7/2012 | Quan | H04N 5/782 386/244 |
| 2013/0219425 A1* | 8/2013 | Swartz | H04N 21/458 725/32 |
| 2013/0227450 A1* | 8/2013 | Na | G06F 3/048 715/764 |
| 2015/0120768 A1* | 4/2015 | Wellen | G06F 17/20 707/755 |
| 2015/0244682 A1* | 8/2015 | Biswas | G06F 3/0481 726/26 |
| 2016/0127765 A1* | 5/2016 | Robinson | H04N 21/4333 725/12 |

* cited by examiner

INFORMATIONAL BANNER CUSTOMIZATION AND OVERLAY WITH OTHER CHANNELS

BACKGROUND

Technical Field

The present disclosure relates generally to displaying real-time audiovisual content to a user, and more particularly, but not exclusively, to providing an informational banner from one channel along with program content from another channel.

Description of the Related Art

Today, users often use one device to watch movies and television shows, while also looking at sports scores and other news on another device. For example, a user may be watching their favorite television show on their television and simultaneously checking the news on their mobile phone. This dual device utilization can distract the user and reduce their enjoyment of their favorite show. In another example, the user may continuously switch television channels between their favorite show and a news station. But often times, both the show and the news are on commercial breaks at the same time, which can result in the user missing some of the news or missing some of their show, or both. To reduce switching between channels, some users have resorted to picture-in-picture functionality to have both the show and the news on the screen at the same time. But in this arrangement, the user's enjoyment of the show may be reduced because of screen sharing properties of traditional picture-in-picture functionality. It is with respect to these and others considerations that the embodiments have been made.

BRIEF SUMMARY

Briefly stated, embodiments are directed towards extracting an informational banner from one source and combining it with video content from another source. The informational banner is selected or identified using one or more different automated or user-selectable methods. The extracted informational banner is combined with video content from another source at a display location that is automatically determined or selected by a user. The combined content is then provided to a display device for presentation to the user.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

Figure 1:
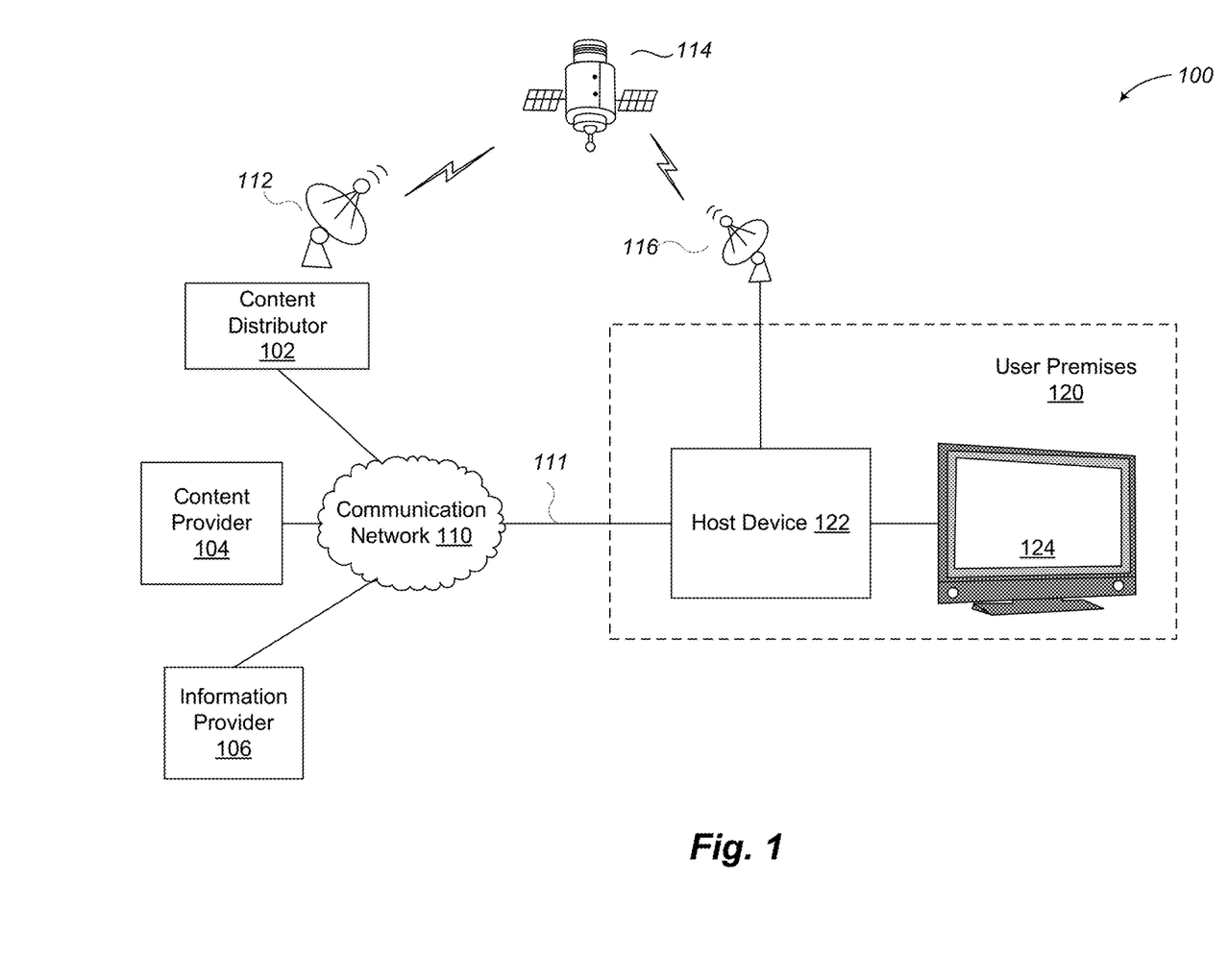
FIG. 1 illustrates a context diagram for providing audiovisual content to a user in accordance with embodiments described herein.

FIG. 1 shows a context diagram of one embodiment for providing audiovisual content to a user in accordance with embodiments described herein. Example 100 may include content provider 104, information provider 106, content distributor 102, communication networks 110, and user premises 120.

Typically, content providers 104 generate, aggregate, and/or otherwise provide audiovisual content that is provided to one or more users. Sometimes, content providers are referred to as "channels." Examples, of content providers 104 may include, but are not limited to, film studios, television studios, network broadcasting companies, independent content producers, such as AMC, HBO, Showtime, or the like, or other entities that provide content for user consumption. A content provider may also include individuals that capture personal or home videos, and distribute these videos to others over various online media-sharing websites or other distribution mechanisms. The content provided by content providers 104 may be referred to as the program content, which may include movies, sitcoms, reality shows, talk shows, game shows, documentaries, infomercials, news programs, sports broadcasts, or the like. In this context, program content may also include commercials or other television advertisements. It should be noted that the commercials may be added to the program content by the content providers 104 or the content distributor 102.

Information provider 106 may create and distribute data or other information that describes or supports audiovisual content. Generally, this data is related to the content provided by content provider 104. For example, this data may include, for example, metadata, program name, closed-caption authoring and placement within the content, timeslot data, pay-per-view and related data, or other information that is associated with the content. In some embodiments, a program distributor 102 may combine or otherwise associate the data from information provider 106 and the content from content provider 104, which may be referred to as the distributed content. However, other entities may also combine or otherwise associate the content and other data together.

In various embodiments, content providers 104, information provider 106, or other entities may add one or more informational banners to the audiovisual content prior to its distribution to users. This resulting content includes the program content, one or more informational banners, and any additional information provided by information provider 106. In some embodiments, metadata associated with the audiovisual content may indicate the placement and size of the informational banners within the video portion of the audiovisual content. In other embodiments, the content distributor 102, the content provider 104, the information provider 106, or other entity may maintain a database of audiovisual content that includes informational banners. The database may store the size and location of the informational banner for a plurality of programs or a plurality of channels.

Content distributor 102 may provide the content, whether obtained from content provider 104 and/or data from information provider 106, to a user through a variety of different distribution mechanisms. For example, in some embodiments, content distributor 102 may provide the content and data to a user's host device 122 directly through communication network 110 on link 111. In other embodiments, the content and data may be sent through uplink 112, which goes to satellite 114 and back to downlink station 116 that may also include a head end (not shown). The content and data are then sent to an individual host device 122 of a user/customer at user premises 120.

Communication network 110 may be configured to couple various computing devices to transmit content/data from one or more devices to one or more other devices. For example, communication network 110 may be the Internet, X.25 networks, or a series of smaller or private connected networks that carry the content and other data. Communication network 110 may include one or more wired or wireless networks.

Host device 122 may be a receiving device of the content from content distributor 102. Examples of host device 122 may include, but are not limited to, a set-top box, a cable connection box, a computer, or other content or television receivers. Host device 122 may be configured to provide the content to a user's display device 124, such as a television, monitor, or other display device. Host device 122 extracts one or more informational banners from one or more sources or television channels and combines them with the content from another source or television channel prior to providing the combined content to the display device 124, as described herein.

The operation of certain aspects of the invention will now be described with respect to FIGS. 2 and 3. In at least one of various embodiments, processes 200 and 300 described in conjunction with FIGS. 2 and 3, respectively, may be implemented by or executed on one or more computing devices, such as host device 122 in FIG. 1.

Figure 2:
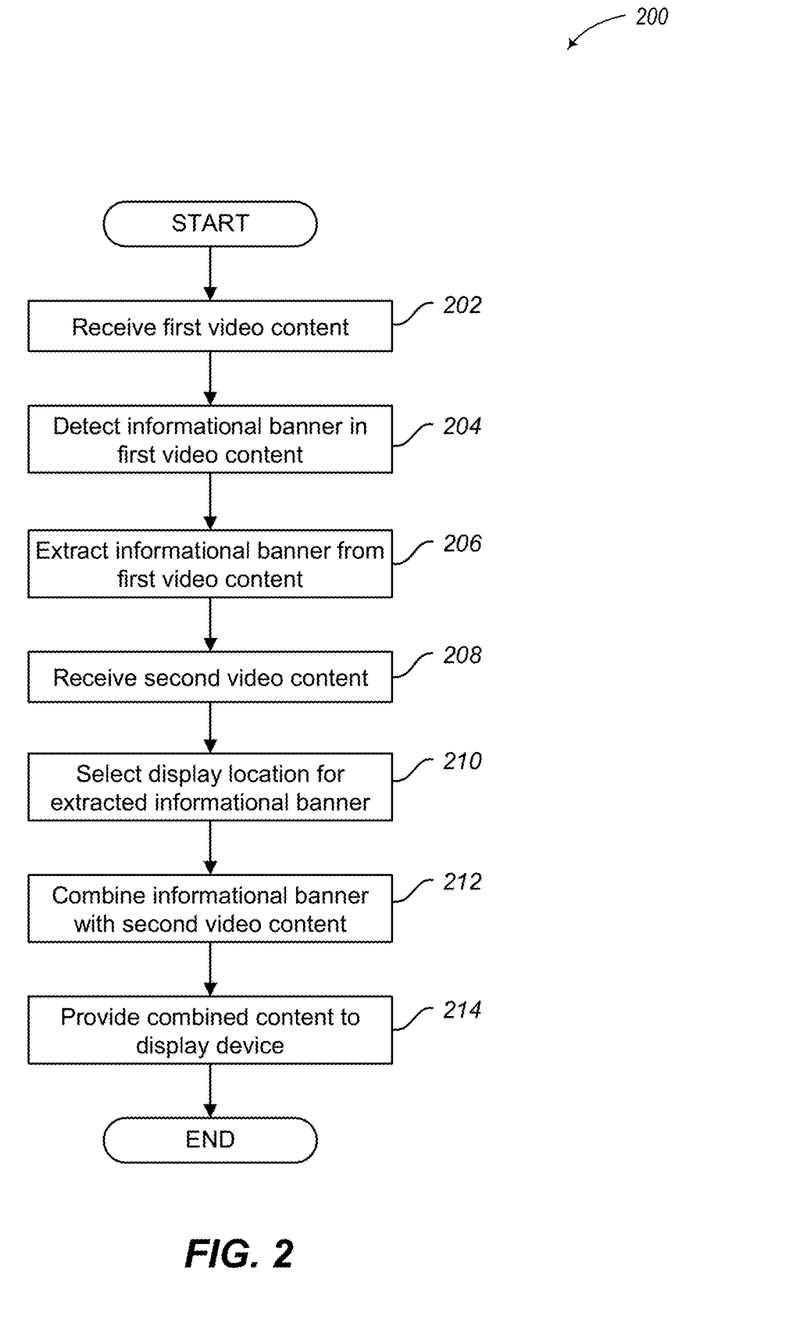
FIG. 2 illustrates a logical flow diagram generally showing one embodiment of an overview process for providing program content from one source with an informational banner from another source in accordance with embodiments described herein.

FIG. 2 illustrates a logical flow diagram generally showing one embodiment of an overview process for providing program content from one source with an informational banner from another source in accordance with embodiments described herein.

Process 200 begins, after a start block, at block 202, where first video content from a first source is received. The first video content includes program content and an informational banner that the user wants to display while viewing other video content. In some embodiments, the user may select and view a first channel from which the first video content is received. In other embodiments, the first video content may be received from a DVR, DVD, or other content source.

Process 200 continues at block 204, where an informational banner in the first video content is detected. The informational banner may be a portion of an image area in consecutive images or frames of the first video content. In at least one embodiment, the informational banner may visually include text or other information that is not included in metadata or other data streams associated with the first video content.

In some embodiments, the presence and location of the informational banner in the image area of the first video content is automatically detected or selected. For example, in at least one embodiment, metadata associated with the first video content may include information that identifies a location of the informational banner within the image area of the first video content. In other embodiments, the first video content is analyzed for scrolling text or other contextual markers of an informational banner. Such other contextual markers may include a predetermined number of pixels in proximity to one another that do not change for a predetermined number of consecutive image frames, borders within the image area, or the like. In yet other embodiments, a database stores information indicating which channels, programs, or content include informational banners and a location of the informational banner in the image area. The system queries the database for the location of the informational banner. For example, the query may include an identifier associated with the first video content; a day, time, and channel of the first video content; etc., and the database returns a location of a corresponding informational banner in the first video content.

In one non-limiting example, the database may include entries for channel 123—Program_A, channel 123—Program_B, channel 547—Program_C, channel 611, and Program_D. The entry for channel 123—Program_A may define an informational banner as the bottom 5% of the image, whereas the entry for channel 123—Program_B may define the informational banner as being 500 pixels across by 80 pixels down and located 80 pixels from the top of the image and centered from left to right, and the entry for channel 611 may define the informational banner as the left 7% of the screen. When a user selects channel 123, while Program_A is showing, the system queries the database to determine if there is an informational banner and its location in the image area. The database returns the corresponding location information, in this case bottom 5% of the image, for use in extracting the informational banner from the first video content. If the user changes to channel 611, the system queries the database and obtains new location information, the left 7% of the screen, for the informational banner.

In other embodiments, a user interface may be displayed on the display device along with the first video content to enable the user to define the boundaries of the informational banner. The user-defined boundaries are used by the system to detect and select the informational banner. In at least one embodiment, the user may utilize a pointer tool, similar to a computer mouse, to 'draw' the boundaries of the informational banner. In another embodiment, one or more guide lines may be displayed on the screen. The user can utilize buttons on a remote control to move the guide lines up, down, left, or right to define the border and location of the informational banner. In other embodiments, a predefined shape may be displayed on the screen from which the user can manipulate the size or location to define the informational banner. In at least one embodiment, the initial size and location of such a shape may be determined using one or more of the automatic-detection mechanisms described above.

In various embodiments, the location and size of the informational banner may be defined by specific pixels; a percentage of the image area; a location, size, and shape of the informational banner; pixel coordinates of each corner of a border of the informational banner; one or more pixel coordinates with additional width or height information; or the like. It should be understood that these mechanisms for detecting or enabling a user to define an informational banner are for illustrative purposes and other mechanisms may be employed to determine an informational banner in the first video content. Also, in various embodiments, one or more information banners may be determined by one or more, or a combination, of the mechanisms described above for detecting and defining an informational banner.

Process 200 continues next at block 206, where the informational banner from the first video content is extracted. In at least one embodiment, as the first video content is received, the data that corresponds to the informational banner may be at least temporarily buffered until it is combined with second video content and provided to the display device for presentation to the user. In some embodiments, the non-informational banner portion of the first video content may not be buffered and may be discarded.

In some embodiments, the extracted informational banner may be modified. For example, the size of the informational banner may be reduced or enlarged. In other embodiments, the colors of the informational banner may be modified or a border added around the informational banner to provide a visual contrast between the extracted informational banner and the content of the second video content, which may include other informational banners. In yet other embodiments, one or more portions of the extracted informational banner may be selected by the user for display along with the second video content. In various embodiments, the modifications to the extracted informational banner may be defined by a user, described in one or more user preferences, predetermined for the informational banner, determined based on the second video content, or the like.

In other embodiments, the extracted informational banner may be stored for some period of time. In this way, the stored extracted informational banner can be combined with live or recorded content at a later date, which is described in more detail below.

Although embodiments are described as extracting an informational banner from video content, embodiments are not so limited. In other embodiments, the informational banner may be extracted from or created from information from one or more internet sources. For example, the informational banner may be generated from an RSS feeds, scraping one or more websites selected by a user for sports score updates or "breaking news," etc. Once generated, the informational banner can be combined with other video content as described below.

Process 200 proceeds to block 208, where second video content is received from a second source. The second video content includes program content that the user wants to view simultaneously with the informational banner in the first video content. In some embodiments, the user may select and view a second channel from which the second video content is received. In other embodiments, the second video content may be received from a DVR, DVD, or other content source. In some embodiments, after the informational banner is determined at block 204, the user may select the second source to view the second video content.

Process 200 continues next at block 210, where a display location within the display area of the display device is selected for the extracted informational banner. The display location includes the positioning and size of the extracted informational banner to be displayed. In various embodiments, the display location may be the same position and size as the informational banner in the first video content. In other embodiments, the display location may be selected or otherwise determined based on the size of the extracted informational banner or the current program of the second video content. The predetermined location may be defined by the user, by the content provider of the second video content, by a system administrator, or the like.

In some embodiments, the user may select a different location of the extracted informational banner. For example, the user may select to have the informational banner displayed on the top of the screen, rather than its original position at the bottom. In other embodiments, the system may automatically choose the display location based on user preferences or the current content of the second video content. For example, one user preference may be to always position the informational banner on the bottom of the screen regardless of the content in the second video. In which case, some of the second video content may be at least partially covered by the extracted informational banner. In some embodiments, a current informational banner may be obtained from the second video content and repositioned above or adjacent to the extracted informational banner from the first video content so that the extracted informational banner is still on the bottom of the screen but does not cover the current informational banner in the second video content.

Another user preference may be for the extracted informational banner to always be on the bottom of the screen but so as to not cover a current informational banner in the second video content. If the second video content includes a current informational banner, then the extracted informational banner may be placed in a different location, such as at the top of the screen, adjacent to and above the current informational banner, or the like.

Process 200 proceeds next to block 212, where the informational banner is combined with the second video content at the determined display location. The combination of the informational banner with the second video content may be determined by the user-defined preferences or an informational banner profiles. The preferences may indicate how the informational banner and the second video content are combined. In at least one embodiment, the extracted informational banner may be overlaid on top of the second video content. In another embodiment, the second video content may be modified, such as shrunk, and the extracted informational banner positioned adjacent to but not overlapping the second video content.

The user preferences may also indicate whether the informational banner is combined with video content for a given channel or source, such that if the user changes the channel, the informational banner is no longer displayed with the content of the new channel. The preferences may instead indicate that the information banner is combined with the content of the new channel, so no matter what channel the user selects, the informational banner will be combined with the video content from that channel.

In some embodiments, the informational banner may be combined with the second video content immediately when the user selects the second video content, such as by changing the channel. In this way, as soon as the user selects a different channel, the informational banner from the first video content is shown with the second video content as if it is part of the second video content, even though it comes from a different source.

In other embodiments, the informational banner may be combined with the second video content based on a predefined condition being satisfied. In one embodiment, the second video content may be provided to the display device without being combined with the informational banner until a predefined word or phrase is detected in the informational banner. The predefined word or phrase may be "breaking news," "score update," a specified sports team, a celebrity's name, etc. Once the predefined phrase is detected, the extracted informational banner is combined with the second video content and presented to the user. Similarly, in another embodiment, the informational banner may be combined with the second video content when there is a change in scores, a final score, an end of period, etc. detected in the informational banner. In yet another embodiment, the predefined condition may be a selection by a user, such as by the user clicking a button on a remote control. The predefined conditions allow a user to view the second video content in its original form until the predefined condition is satisfied, at which point the informational banner is added to the second video content and the user can view the informational banner along with the second video content to see the breaking news, information about their favorite celebrity, score updates, etc.

In some embodiments, the informational banner may be temporarily combined with the second informational banner for a predetermined amount of time, or until a user selects another button to remove the informational banner from being combined with the second video content.

In some other embodiments, the informational banner is not combined with the second video content during a commercial of the first video content or when it is no longer available. In some embodiments, the presence of a commercial may be determined from metadata associated with the first video content, a percentage of pixels within informational banner that change, etc. If a commercial is detected, the informational banner may not be combined with the second video content until after the commercial is over and the informational banner returns to the first video content. In other embodiments, the informational banner may be modified to be blank or include other logos or content during the commercial.

In various other embodiments, the second video content may be a "dummy" channel that does not include program content from a content provider. Rather, the dummy channel is a blank content source that is customizable by a user. One or more informational banners may be extracted from one or more different sources, by employing embodiments described herein, and combined for output via the dummy channel.

Process 200 continues at block 214, where the combined content is provided to a display device. In at least one embodiment, the extracted informational banner and the second video content may be combined to a single display stream and provided to the display device. In this way, the display device is unaware that the original video source was modified to include an informational banner from another source.

By employing embodiments herein, an informational banner can also be removed from video content. For example, in some embodiments, video content can be received and an informational banner determined in the video content, such as described in blocks 202 and 204. But instead of extracting the informational banner and adding it to other video content, the informational banner may be blocked or otherwise removed from the content. In some embodiments, other content, such as a black pixels, logos, etc., may be added to the video content where the informational banner is positioned. In other embodiments, the remaining video content may be resized to fit the display area of the display device without the informational banner being displayed. By removing or blocking the informational banner, the user can watch one football game that includes an informational banner with score updates and simultaneously record another football game, but the informational banner is not shown to the user so scores of the recorded game are not provided to the user.

Figure 3:
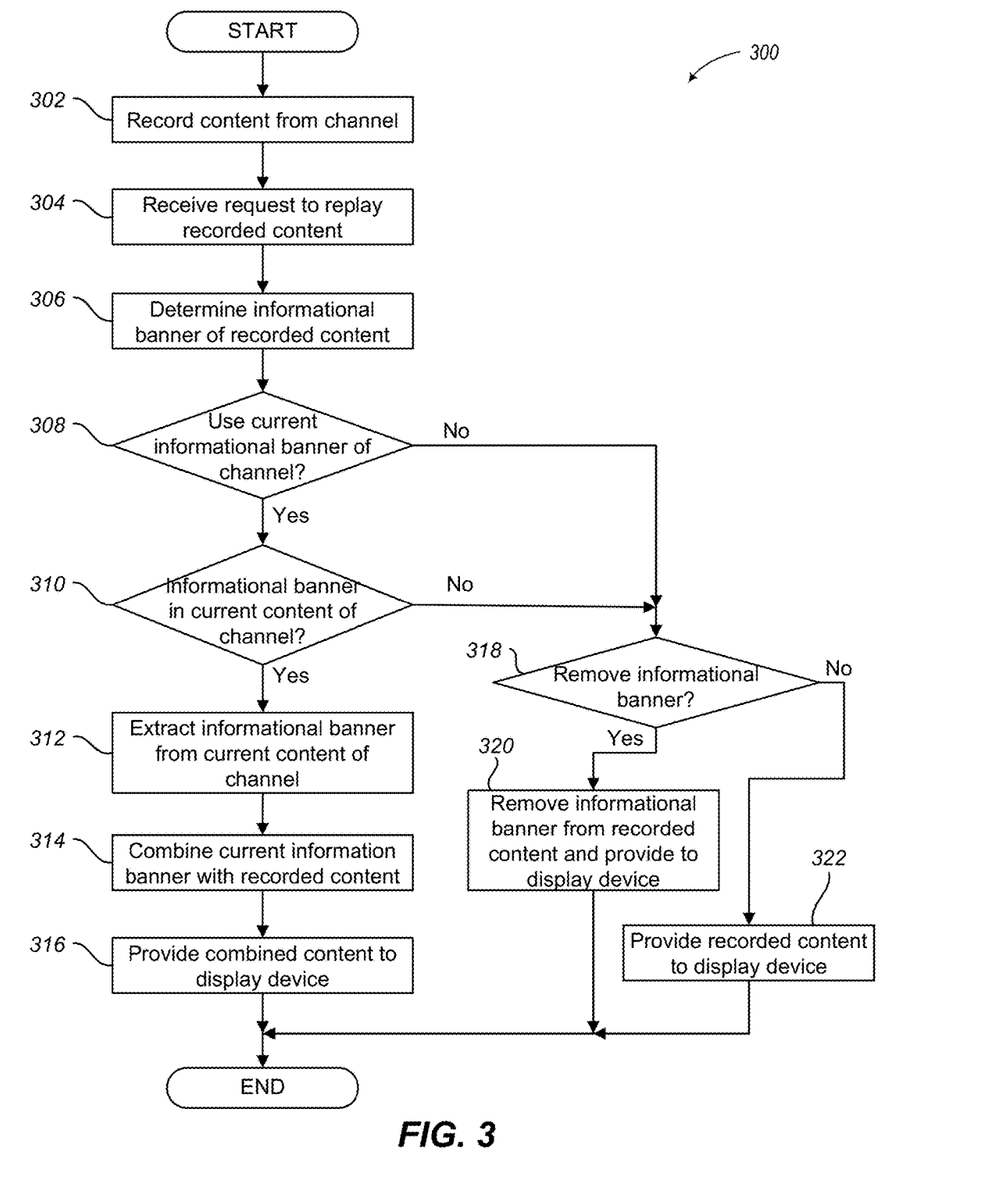
FIG. 3 illustrates a logical flow diagram generally showing one embodiment of a process for providing a current informational banner along with content that was previously recorded in accordance with embodiments described herein.

FIG. 3 illustrates a logical flow diagram generally showing one embodiment of a process for providing a current informational banner along with content that was previously recorded in accordance with embodiments described herein.

Process 300 begins, after a start block, at block 302, where content from a channel is recorded. In various embodiments, the host device 122 may store a copy of the content on a DVR or other recording device.

Process 300 proceeds to block 304, where a request to replay the recorded content is received. This request may be obtained from a user when the user selects to playback the recorded program.

Process 300 continues at block 306, where the informational banner of the recorded content is determined. In at least one of various embodiments, block 306 employs embodiments of block 204 of FIG. 2 to detect the informational banner in the recorded content.

Process 300 proceeds next to decision block 308, where a determination is made whether a current informational banner of the channel is to be used instead of the informational banner recorded with the original content. In at least one of various embodiments, the system provides the user a prompt from which the user can select to use the current informational banner of the channel or the informational banner that was recorded with the original content. In other embodiments, user preferences may indicate whether or not to use the current informational banner without prompting the user. If a current informational banner is used, process 300 flows to decision block 310; otherwise, process 300 flows to decision block 318.

At decision block 310, a determination is made whether there is a current informational banner in the content of the channel. In at least one of various embodiments, this determination may be performed by employing various embodiments of block 204 of FIG. 2. If there is a current informational banner, then process 300 flows to block 312; otherwise, process 300 flows to decision block 318.

At block 312, the current informational banner is extracted from the current content of the channel. In at least one of various embodiments, block 312 may employ embodiments of block 206 of FIG. 2 to extract the current informational banner from the current content, where the current content is the first video content.

Process 300 proceeds to block 314, where the extracted current informational banner is combined with the recorded content. In various embodiments, block 314 employs embodiments of block 212 of FIG. 2 to combine the extracted current informational banner with the recorded content, where the recorded contest is the second video content. Similar to the process in FIG. 2, the display location for the extracted current informational banner may also be determined similar to what is described in block 210.

Process 300 continues at block 316, where the combined content is provided to a display device. In various embodiments, block 316 employs embodiments of block 214 of FIG. 2. After block 316, process 300 terminates or returns to a calling process to perform other actions.

If at decision block 308 the current informational banner of the channel is not used or if at decision block 310 there is no current informational banner, then process 300 flows from decision blocks 308 and 310 to decision block 318. At decision block 318, a determination is made whether the informational banner is removed from the recorded content. In at least one of various embodiments, the system provides the user a prompt from which the user can select to remove or otherwise block the informational banner in the recorded content. In other embodiments, user preferences may indicate when to remove the recorded informational banner. For example, if the user selects to use the current informational banner of the channel, but there is no current informational banner, then the system may automatically remove the recorded informational banner. It should be recognized that other user preferences may also be employed. If the informational banner is to be removed, process 300 flows to block 320; otherwise, process 300 flows to block 322.

At block 320, the informational banner in the recorded content is removed and the resulting content is provided to the display device. In some embodiments, the image portion associated with the informational banner may be modified to be a predetermined pattern, such as all black, or to one or more logos or designs. For example, the name of the cable service provider may be inserted into the image area instead of the informational banner. In other embodiments, the program portion of the recorded content may be expanded or resized so that the program portion fills the display area without the informational banner. Once the informational banner is removed from the recorded content, the resulting content is provided to the display device similar to what is described at block 214 of FIG. 2. After block 320, process 300 terminates or returns to a calling process to perform other actions.

If the informational banner is not removed from the recorded content, process 300 flows from decision block 318 to block 322 where the recorded content is provided to the display device for presentation to the user. After block 322, process 300 terminates or returns to a calling process to perform other actions.

Figure 4A:
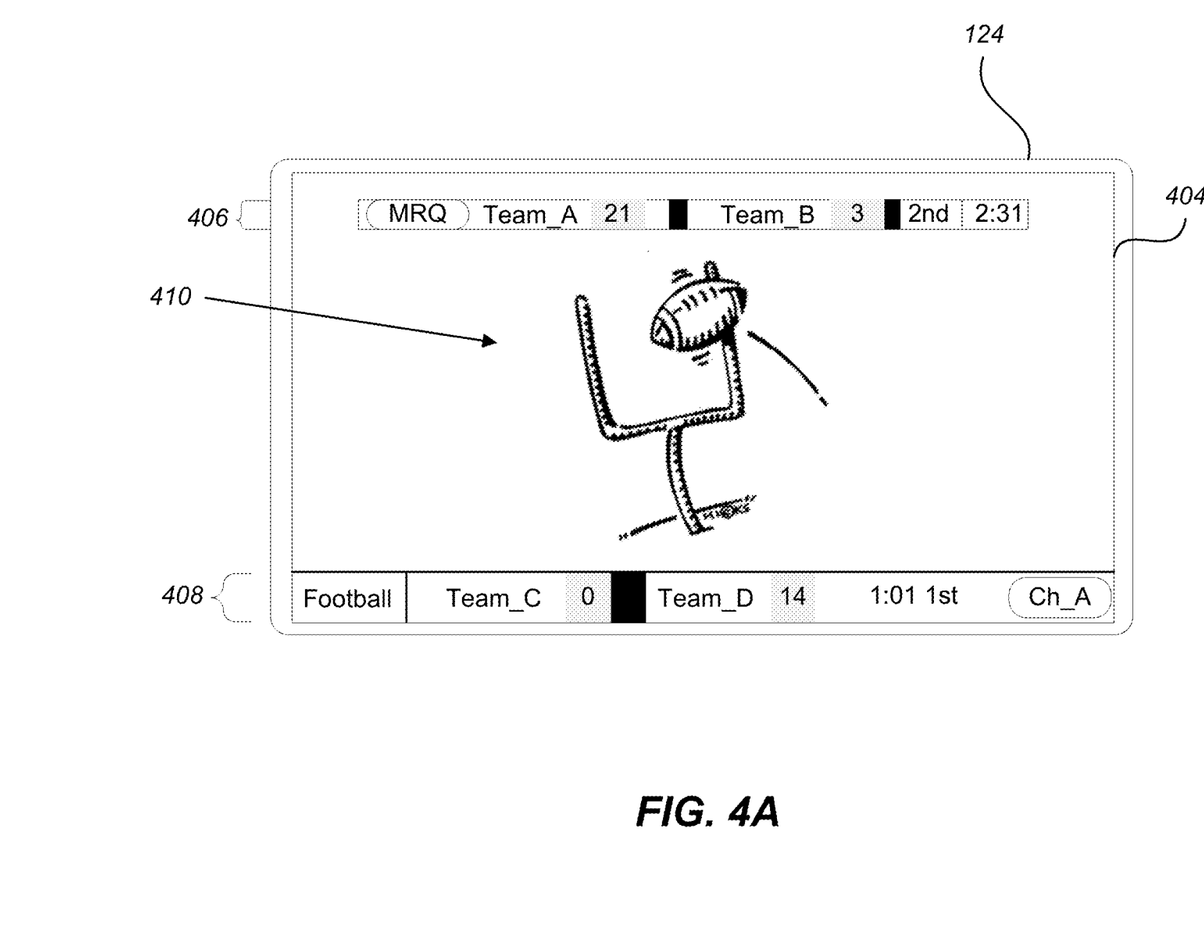
FIGS. 4A-4K show various use case examples of selecting and providing program content with an informational banner in accordance with embodiments described herein.

FIGS. 4A-4K show various use case examples of selecting and providing program content with an informational banner in accordance with embodiments described herein. FIG. 4A illustrates display device 124, which includes a display area 404. The display area 404 is often the same or similar in size as the screen size of the display device 124. But the display area may be smaller than the screen size due to configuration of the display device, such as modifications in the aspect ratio, zoom features, or the like, or other borders or banners to be displayed around the content.

FIG. 4A shows one example of channel "Ch_A." It should be understood that channel Ch_A is for illustrative purposes and is not to be exhaustive or limiting. As shown, the current content of channel Ch_A includes program content 410 along with scoreboards 406 and 408. In this example, the program content 410 is a football game, the scoreboard 406 displays the score of the current game, and the scoreboard 408 displays scores of other football games and sporting events.

Assume, however, the user is uninterested in watching the football game, but wants to receive score updates for other games while watching a movie on a different channel. By employing embodiments described herein, an informational banner may be extracted from the content of channel Ch_A and combined with content from another channel.

Figure 4B:
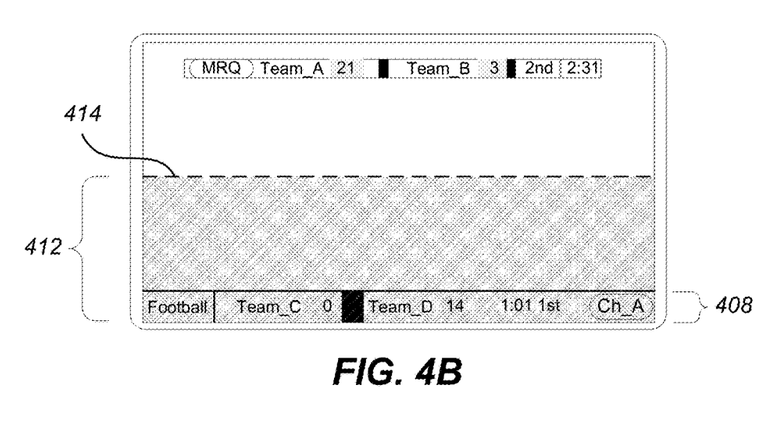
Figure 4C:
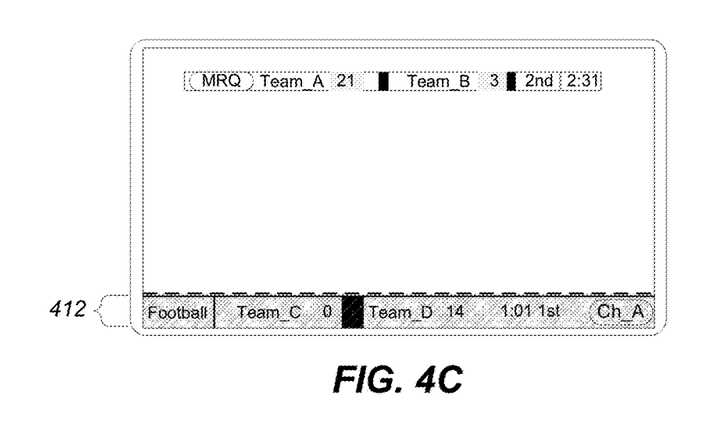
Figure 4D:
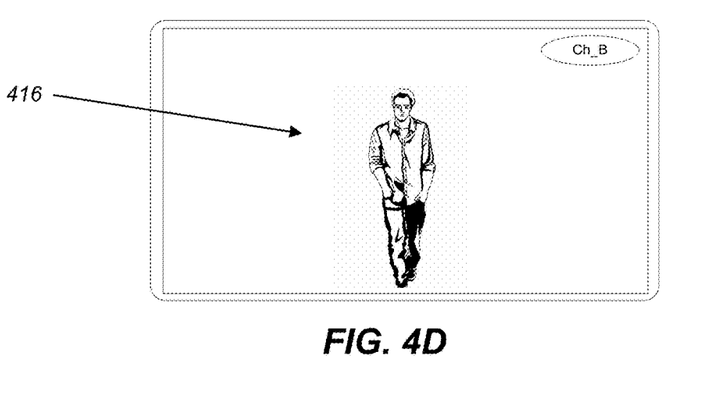

FIG. 4B illustrates one example of a user interface that is provided to the user to define the informational banner to extract from the content of channel Ch_A. In this example, a guide line 414 is positioned on the screen of the display device. The user can move the guide line 414 up or down to change the size of informational banner 412. The user can move the guide line 414 down to a position adjacent to a top of the scoreboard 408, which is illustrated in FIG. 4C.

Figure 4E:
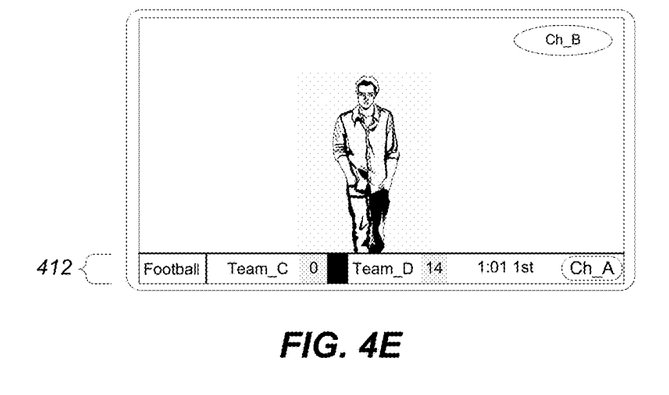

Once the informational banner 412 is determined, the user can change the channel to the channel showing the movie of interest to the user. As briefly shown in FIG. 4D, channel Ch_B is showing content 416. The user may then select an option to show the informational banner from a different channel. The system extracts the informational banner 412 from the content of channel Ch_A and combines it with the content of channel Ch_B, which is illustrated in FIG. 4E. In this example, the previously established preferences may indicate that the informational banner is to be overlaid on top of the content 416 and in its original position without any modification to the content 416 or to the informational banner 412.

Figure 4F:
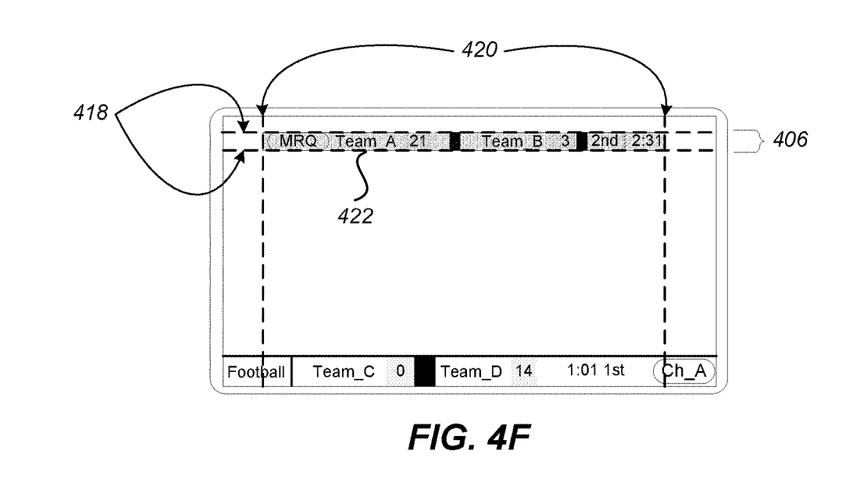
Figure 4G:
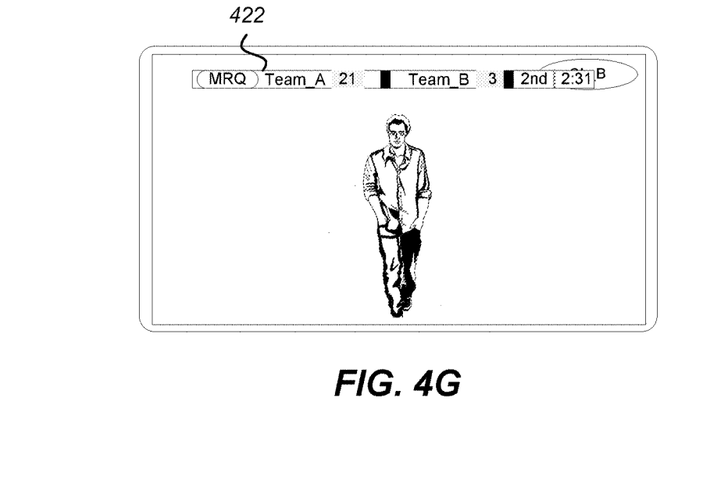
Figure 4H:
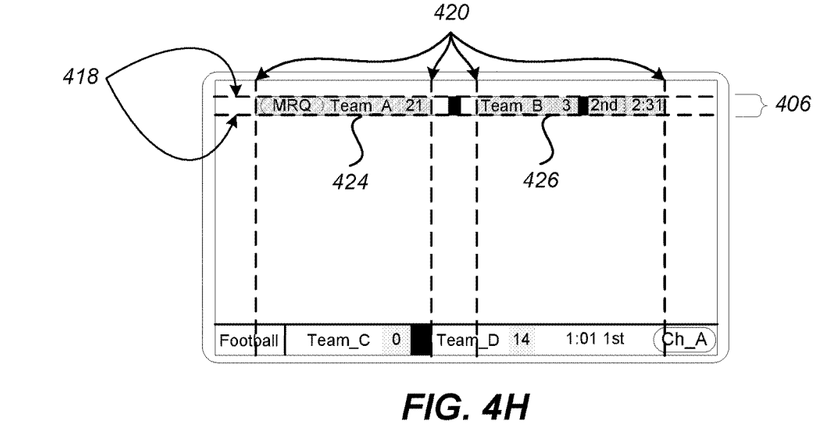

In another example, the user may desire to keep track of the score of the football game while watching the movie. In this case, as illustrated in FIG. 4F, the user can utilize a plurality of vertical guide lines 420 and a plurality of horizontal guide lines 418 to define informational banner 422 to extract scoreboard 406 from channel Ch_A. Once the informational banner 422 is determined, the user can change the channel to the movie channel to show both the movie and the informational banner 422, which is shown in FIG. 4G. FIG. 4G shows the informational banner 422 in its original position within the display area. As described above, a location of the extracted informational banner may be automatically determined or selected by a user.

Figure 4I:
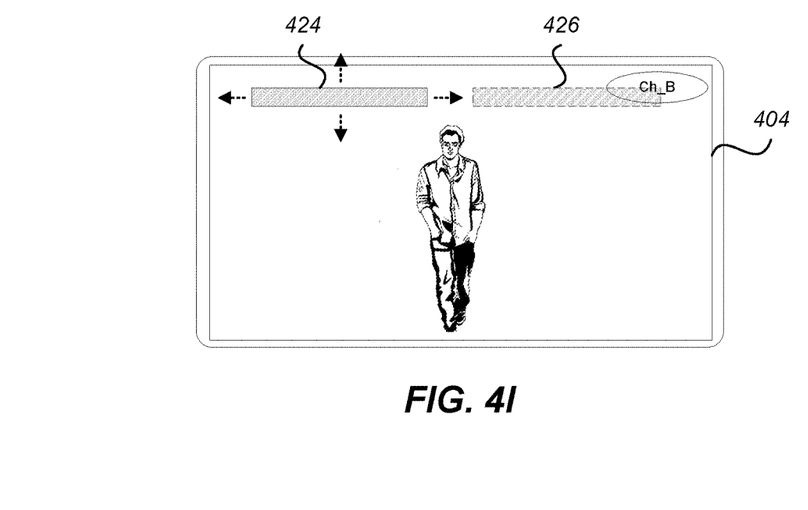
Figure 4J:
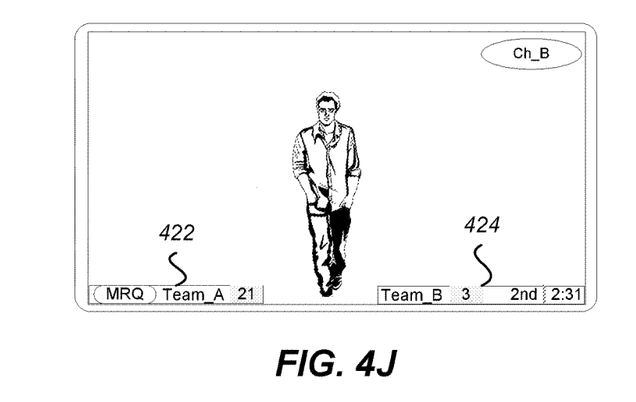

Similar to FIG. 4F, FIG. 4H again illustrates a plurality of vertical guide lines 420 and a plurality of horizontal guide lines 418. In this example, two informational banners 424 and 426 are defined by the guide lines 418 and 420. Once the informational banners 424 and 426 are determined, the user can change the channel to the movie channel. The user can then maneuver informational banners 424 and 426 to different locations in display area 404, which is illustrated in FIG. 4I. In one non-limiting, non-exhaustive example, each of the informational banners 424 and 426 may be positioned separately, such as by the user using directional arrows on a remote control. Once the position of informational banners 424 and 426 are selected, the content associated with the informational banners may be extracted and combined with the content of channel Ch_B, which is illustrated in FIG. 4J.

Figure 4K:
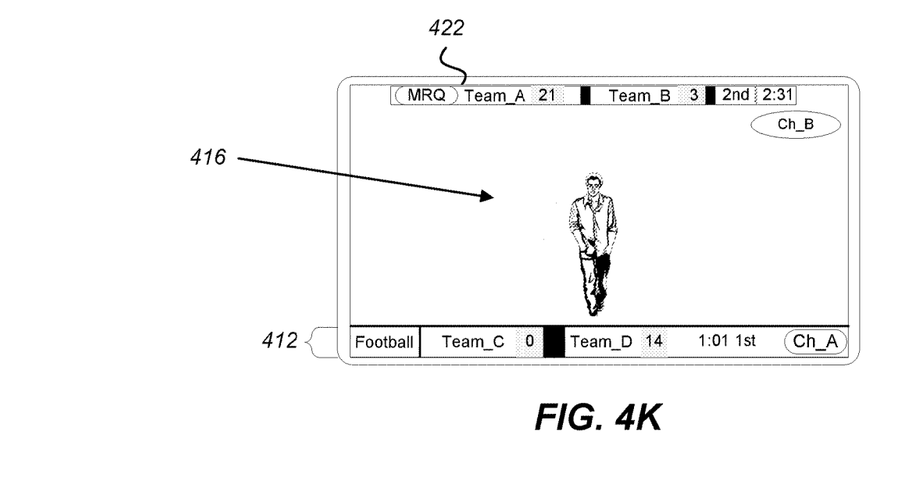

FIG. 4K illustrates another example where informational banners 412 and 422 are extracted and combined with the content of channel Ch_B. But in this illustration, the informational banner 422 is moved to the top of the screen and the content 416 is resized so that the informational banners 412 and 422 are adjacent to the content 416 and do not cover the content 416.

It should be noted that the various embodiments for selecting, modifying, and moving informational banners described above can be used alone or in combination.

Figure 5:
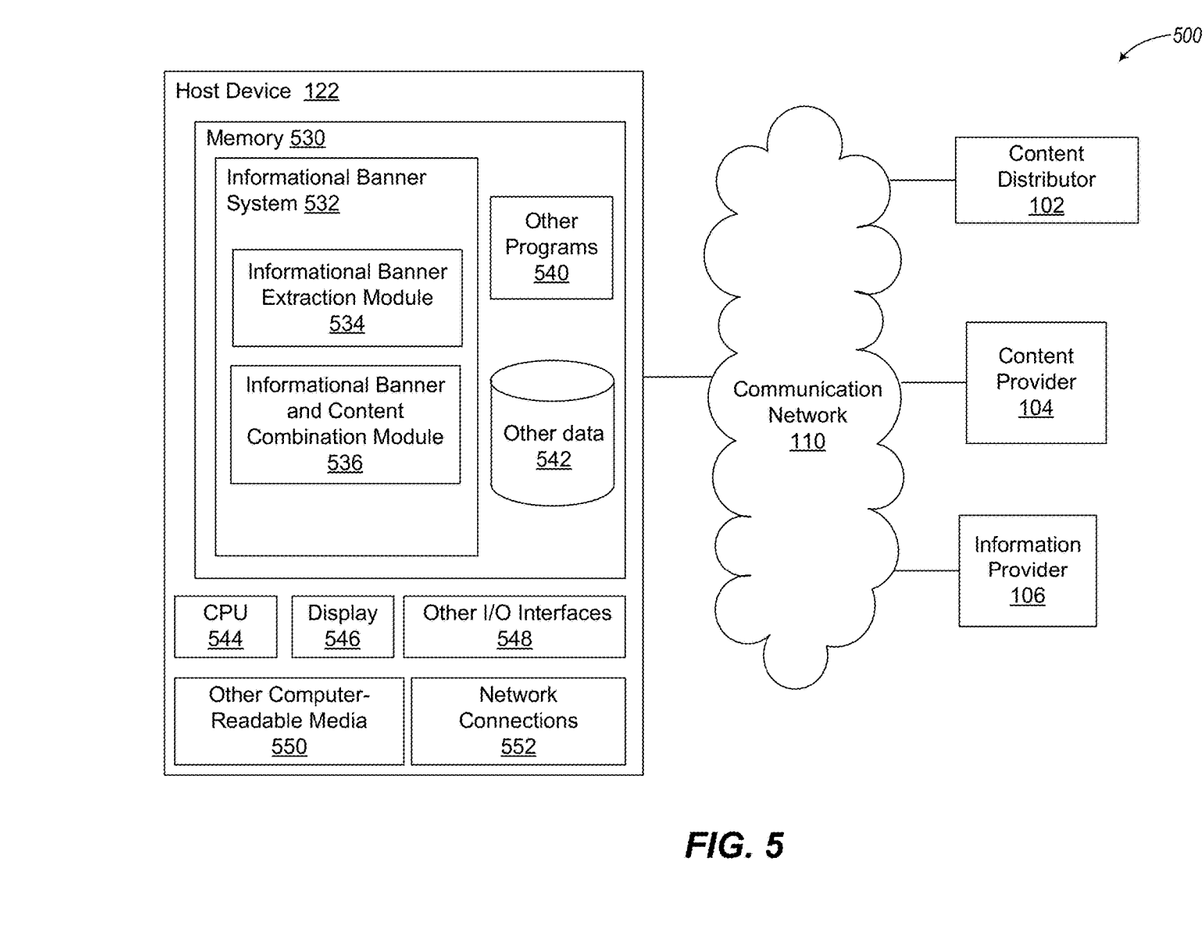
FIG. 5 shows a system diagram that describes one implementation of computing systems for implementing embodiments described herein.

FIG. 5 shows a system diagram that describes one implementation of computing systems for implementing embodiments described herein. System 500 includes host device 122, content distributor 102, content provider 104, and information provider 106. Host device 122 receives content from content distributor 102 and extracts an informational banner from the content of one channel and combines it with content from another channel, as described herein.

One or more general-purpose or special-purpose computing systems may be used to implement host device 122 to extract informational banners and combine it with other content. Accordingly, various embodiments described herein may be implemented in software, hardware, firmware, or in some combination thereof.

Host device 122 may include memory 530, one or more central processing units (CPUs) 544, display interface 546, other I/O interfaces 548, other computer-readable media 550, and network connections 552.

Memory 530 may include one or more various types of non-volatile and/or volatile storage technologies. Examples of memory 530 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 530 may be utilized to store information, including computer-readable instructions that are utilized by CPU 544 to perform actions, including embodiments described herein.

Memory 530 may have stored thereon informational banner system 532, which includes informational banner extraction module 534 and informational banner and content combination module 536. Informational banner extraction module 534 may employ embodiments described herein to extract an informational banner from the content of one channel and informational banner and content combination module 536 may employ embodiments described herein to combine the extracted informational banner with the content of another channel. Memory 530 may also store other programs 540 and other data 542. For example, other data 542 may include a DVR or other recording device for storing recorded content or recorded informational banners.

Display interface 546 is configured to provide content, including combined informational banner and unrelated content, to a display device, such as display device 124 in FIG. 1. Network connections 552 is configured to communicate with other computing devices, such as content distributor 102, via communication network 110. Other I/O interfaces 548 may include a keyboard, audio interfaces, other video interfaces, or the like. Other computer-readable media 550 may include other types of stationary or removable computer-readable media, such as removable flash drives, external hard drives, or the like.

Content distributor 102, content provider 104, information provider 106, and host device 122 may communicate via communication network 110.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   receiving first video content having program content and an informational banner, wherein the program content and the informational banner are to be presented together in an image area of the first video content;
   identifying metadata associated with the first video content, the metadata including information that defines a size and pixel location of the informational banner in the image area of the first video content;
   overlaying, based on the size and the pixel location of the informational banner defined in the metadata, a plurality of guide lines on the image area of the first video content for presentation to the user on a display device;
   receiving input from the user to modify a position of each of the plurality of guide lines;
   defining a first informational banner in the first video content based on the position of a first set of the plurality of guide lines;
   defining a second informational banner in the first video content based on the position of a second set of the plurality of guide lines;
   extracting the defined first informational banner from the first video content;
   extracting the defined second informational banner from the first video content;
   receiving second video content for presentation on the display device having a display area;
   selecting a first display location for the extracted first informational banner within the display area of the display device;
   selecting a second display location for the extracted second informational banner within the display area of the display device, the second display location being selected independently from selecting the first display location;
   generating display content by combining the second video content and the extracted first and second informational banners with the extracted first informational banner positioned at the selected first display location and the extracted second informational banner positioned at the selected second display location; and
   providing the display content to the display device for presentation to a user, having the second video content display simultaneously with the extracted first and second informational banners from the first video content.

2. The method of claim 1, wherein the informational banner includes a news ticker, a scoreboard, or an informational window of a program.

3. The method of claim 1, further comprising:
   determining a remainder of the display area of the display device based on a size of the extracted first and second informational banners; and
   modifying the second video content to fit within the remainder of the display area such that the second video content and the extracted first and second informational banners do not overlap when combined to generate the display content.

4. The method of claim 1, wherein generating the display content further comprises overlaying the extracted first and second informational banners on the second video content so as to cover a portion of the second video content.

5. The method of claim 1, further comprising manipulating at least one of a size, a color, a rotation, a position, or a border of the extracted first informational banner prior to combining with the second video content.

6. The method of claim 1, wherein the first display location includes a size and pixel location of the extracted first informational banner in the display area.

7. The method of claim 1, wherein the defined first informational banner is identified by a size and pixel location in the first video content.

8. The method of claim 1, wherein generating the display content further comprises:
   preventing at least the first informational banner from being combined with the second video content when the program content of the first video content is a commercial.

9. The method of claim 1, further comprising:
   storing at least the extracted first informational banner prior to receiving the second video content; and pausing the storing of the extracted first informational banner during commercials in the program content of the first video content so as to remove non-informational banner content that is present during the commercials from the stored extracted first informational banner.

10. The method of claim 1, wherein selecting the display location for the extracted first informational banner further comprises:
    analyzing the second video content to determine if the second video content contains a second informational banner; and
    if the second video content includes the second informational banner, setting the first display location for the extracted first-informational banner to be adjacent to the second informational banner without overlapping the second informational banner;
    if the second video content does not include the second informational banner, setting the first display location for the extracted first informational banner based on a user-defined display location.

11. The method of claim 1, wherein selecting the display location for the extracted first informational banner further comprises:
    analyzing the second video content to determine if the second video content contains a second informational banner; and
    if the second video content includes the second informational banner, extracting the second informational banner, setting the first display location for the extracted first informational banner to be at a bottom of the display area and setting another display location for the extracted second informational banner adjacent to the first informational banner without overlapping the first informational banner;
    if the second video content does not include the second informational banner, setting the first display location for the extracted first informational banner based on a user-defined display location.

12. The method of claim 1, further comprising:
    prior to receiving the first video content:
        storing the second video content for future playback;
        receiving a request to play the stored second video content;
        determining that the stored second video content includes another informational banner; and
        identifying the first video content based on the other informational banner, wherein the informational banner in the first video content includes current information; and
    wherein the extracted first informational banner includes the current information and is combined with the stored second video content to generate the display content.

13. The method of claim 12, wherein the first video content and the second video content are from a same channel such that the other informational banner includes old information and is replaced with the current information from the extracted first informational banner from the first video content.

14. A television receiver, comprising:
    a memory that stores instructions; and
    a processor that executes the instructions to:
        receive first video content with metadata that defines a size and pixel location of a first informational banner in the first video content;
        overlay, based on the size and the pixel location of the first informational banner, a plurality of guide lines on the first video content;
        provide the first video content overlaid with the plurality of guide lines to a display device for presentation to a user, a position of at least a portion of the plurality of guide lines on the first video content being manipulatable by the user;
        receive input from the user to modify the position of at least one of the plurality of guide lines on the first video content;
        select the first informational banner from the first video content based on the position of a first set of the plurality of guide lines defining at least one side of a border and location of the first informational banner;
        select a second informational banner from the first video content based on the position of a second set of the plurality of guidelines defining at least one side of a border and location of the second informational banner;
        extract the first and second informational banners from the first video content;
        select a first location for the extracted first informational banner to be placed within second video content;
        select a second location for the extracted second informational banner to be placed within the second video content;
        generate display content by combining the second video content and the extracted first and second informational banners with the extracted first and second informational banners being positioned at the selected first and second locations; and
        provide the display content to the display device for presentation to the user.

15. The television receiver of claim 14, wherein the first and second locations are determined based on one or more user-provided coordinates within a display area of the display device.

16. The television receiver of claim 14, wherein the plurality of guide lines include a plurality of vertical guide lines and a plurality of horizontal guide lines, and wherein the processor further executes the instructions to:
    overlay the plurality of vertical guide lines and the plurality of horizontal guide lines on the first video content for presentation to the user;
    receive input from the user to modify the position of each of the plurality of vertical guide lines and the plurality of horizontal guide lines;
    select the first informational banner from the first video content as being an area defined by a first set of the plurality of vertical guide lines and a first set of the plurality of horizontal guide lines being the border of the first informational banner; and
    select the second informational banner from the first video content as being an area defined by a second set of the plurality of vertical guide lines and a second set of the plurality of horizontal guide lines being the border of the second informational banner.

* * * * *